United States Patent [19]

Totty

[11] Patent Number: 4,675,259

[45] Date of Patent: Jun. 23, 1987

[54] ELECTRICAL ENERGY PACKAGE AND METHOD OF ASSEMBLY

[75] Inventor: Charles D. Totty, Duncan, Okla.

[73] Assignee: Halliburton Company, Duncan, Okla.

[21] Appl. No.: 833,873

[22] Filed: Feb. 25, 1986

[51] Int. Cl.[4] .............................................. H01M 2/20
[52] U.S. Cl. .................................. 429/157; 429/159;
29/623.1; 175/104
[58] Field of Search ................ 429/99, 157, 159, 123,
429/149, 150, 178; 175/92, 93, 104; 29/623.1

[56] References Cited

U.S. PATENT DOCUMENTS

| | | | |
|---|---|---|---|
| 1,297,653 | 3/1919 | Burgess | 429/157 |
| 1,401,671 | 12/1921 | Chubb | 429/123 |
| 1,457,671 | 6/1923 | Rector | 429/150 |
| 3,220,888 | 11/1965 | Moore et al. | 429/157 |
| 4,562,128 | 12/1985 | Humphreys et al. | 429/178 |

*Primary Examiner*—Donald L. Walton
*Attorney, Agent, or Firm*—Joseph A. Walkowski

[57] ABSTRACT

A self-contained electrical energy source, particularly embodied as a linear array of interconnected battery cells, includes a housing having the cells linearly disposed therein. At the two ends of the housing, mechanical connectors are provided for coupling with the apparatus to be energized by the energy source and for coupling with additional energy sources in a selectable electrical series and/or electrical parallel configurations. The electrical potential provided by the batteries within the housing is connected to both connectors through separate conductive paths which include folded conductors that permit the conductors to be deformed in response to forces that might act upon the conductors.

19 Claims, 10 Drawing Figures

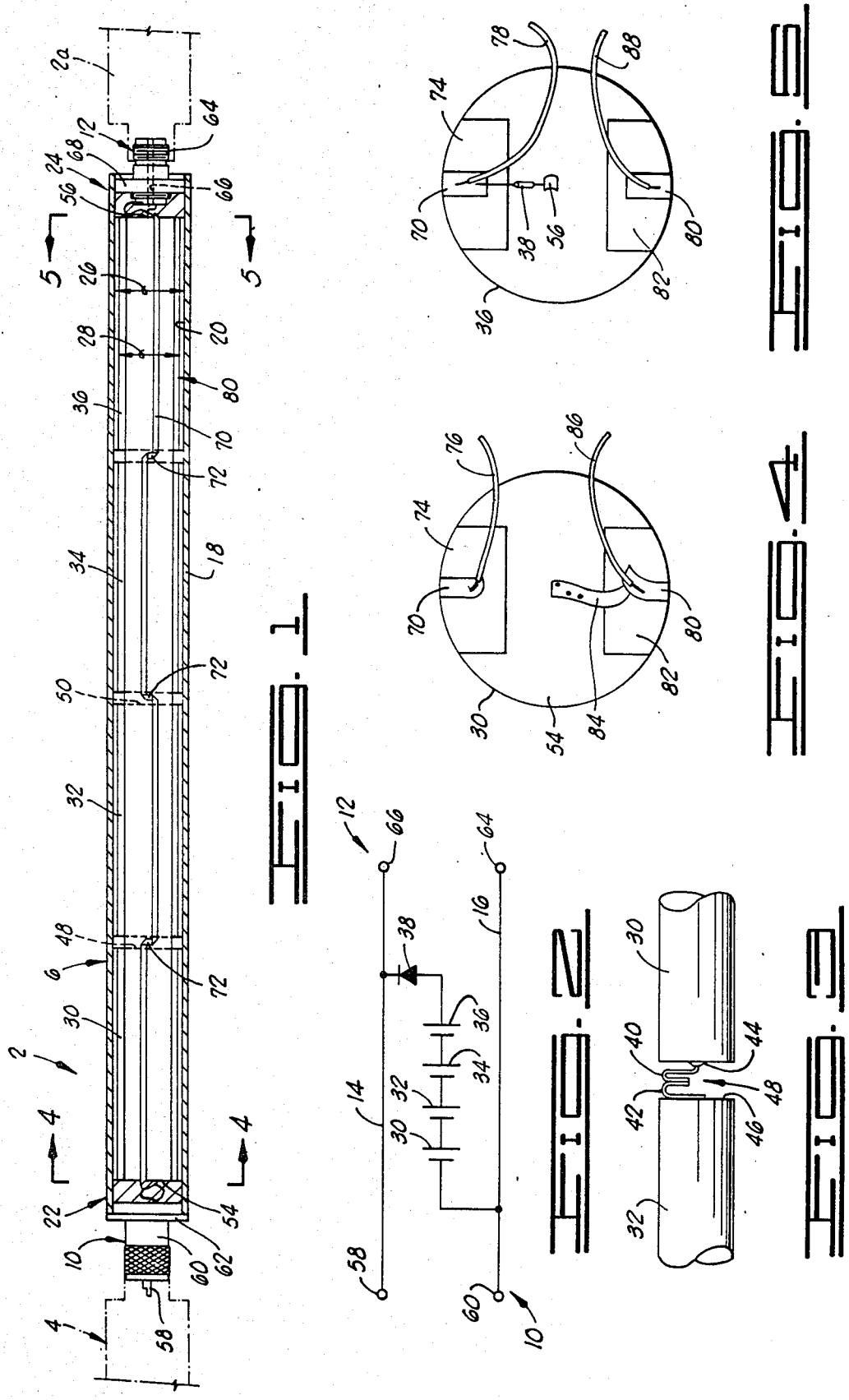

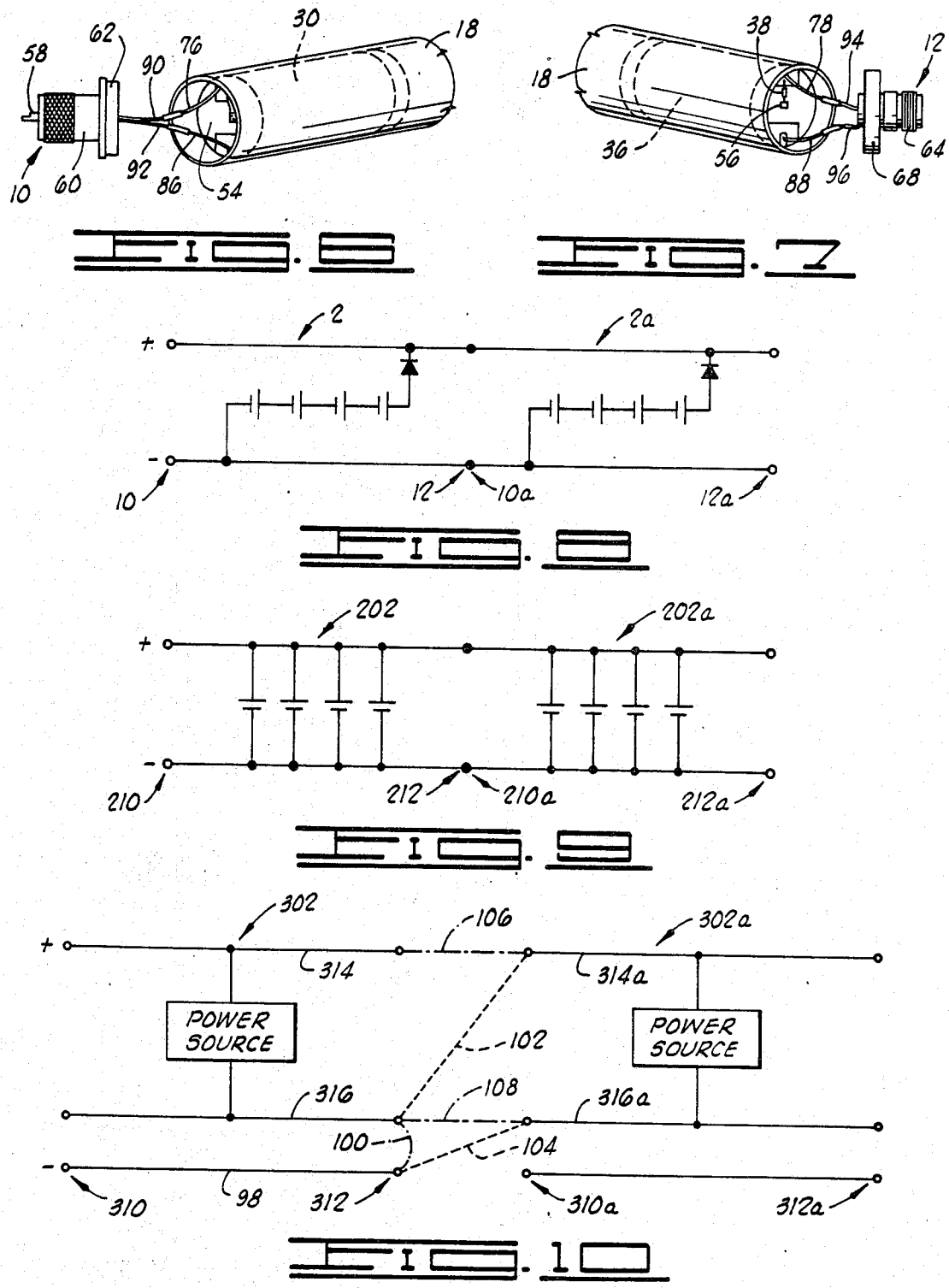

ELECTRICAL ENERGY PACKAGE AND METHOD OF ASSEMBLY

BACKGROUND OF THE INVENTION

The present invention relates generally to electrical energy sources and more particularly, but not by way of limitation, to interconnectible battery packages for a down-hole tool used in an oil or gas well. The present invention also relates to a method of assembling such an energy source.

The need for electrical energy sources is, of course, widespread. In particular, battery packs or other portable, self-contained electrical power sources are needed for all types of portable electrical apparatus such as portable televisions, radios and video recorders. One other specific usage is with electrical downhole tools, such as a downhole pressure and temperature gauge or a perforating gun, used in making, completing and producing oil and gas wells. It is to this last-mentioned specific need that the present invention is particularly addressed; however, it is contemplated that the present invention can be adapted for more general usage applicable to a variety of other types of electrical apparatus.

Prior electrical energy sources designed for downhole tools have utilized electrical connections that are difficult to use or that are unreliable in particular applications. Such designs have included one or more batteries hard-wired to the circuit to be energized, thereby making it difficult to replace batteries and thereby placing capacity limitations on how long the circuit can be energized. Other designs have used mechanical connections, such as by means of banana jacks or set screws, which are more readily interchangeable than the hardwired designed; however, these mechanical connections have been found to provide unreliable mechanical, and consequently unreliable electrical, connections, at least in certain applications. Some designs have included a number of batteries or cells linearly arranged in a tube, in a manner analogous to batteries in a flashlight; however, such arrays have not been readily and selectably connectibel in both series and parallel configurations with additional tubes of batteries.

Although such prior designs have been useful within their limitations, there is the need for an improved electrical energy source that overcomes the aforementioned shortcomings. That is, there is the need for an improved electrical energy source that can be used in a variety of tools and that can be readily connected to and disconnected from them through positive, reliable mechanical connectors. Such a source should be packaged in a uniform nature so that it is readily interchangeable and interconnectible with other ones of a similar design. Such interconnectability should also allow two or more packages to be connected either in electrical series or in electrical parallel or a combination of the two.

Of particular significance for the specific application in combination with a downhole tool, but also of general value, is the need for such a source to be compact, and relatively simply but sturdily constructed. Because significant forces can be encountered in a downhole environment, for example, such as from a perforating gun with which the present invention is contemplated to be useful, the electrical conductors within the source should be configured to deform in response to such forces without breaking the electrical continuity.

SUMMARY OF THE INVENTION

The present invention overcomes the above-noted and other shortcomings of the prior art by providing a novel and improved electrical energy source and method of assembling the same. The present invention is versatile in that it can be adapted for use with a variety of types of electrical apparatus. It utilizes reliable, easy-to-use mechanical connectors, and it has a uniform construction which can be interconnected through such mechanical connectors in electrical series and electrical parallel combinations. The present invention is compact, and it is relatively simply but sturdily constructed. Deformable electrical conductors are used so that length-affecting forces can be withstood without breaking electrical continuity within the electrical energy source.

In general, the battery package design described more particularly hereinbelow uses simple connectors on both ends of an elongated housing to provide both electrical and mechanical connections reliably and simply. Batteries contained within the housing provide voltages and capacities which may be increased by stringing additional battery packs together in electrical series and parallel combinations. Individual batteries or cells within each housing may be connected in series, parallel or series/parallel combinations to obtain desired voltages and capacities within each package of the present invention.

This present invention broadly comprises a housing; power supply means, disposed in the housing, for providing an elect4ical potential; first connector means attached to the housing; and second connector means attached to the housing. The electrical energy source also includes conductor means for connecting the power supply means to the two connector means so that the electrical potential is applied across two respective portions of each of the connector means.

In its particular application with a downhole tool having an electrical circuit connected to a mechanical connector, the first connector means is attached to one of the housing and to the power supply means for mechanically coupling with the mechanical connector of the downhole tool so that the electrical potential of the power supply means is connected therethrough to the electrical circuit of the downhole tool. The second connector means is attached to the other end of the housing and to the power supply means for mechanically coupling with another source of electrical energy similar to this defined source of electrical energy.

The present invention also provides a particular method of assembling the electrical energy source, comprising: connecting a linear array of batteries in electrical combination so that a first electrical potential terminal is defined and so that a second electrical potential terminal is defined; placing a first strip of insulating material lengthwise along the batteries between the ends thereof; placing a second strip of insulating material lengthwise along the batteries between the ends thereof; placing a first electrical conductor along the first strip of insulating material and connecting the first electrical conductor to the first electrical potential terminal; placing a second electrical conductor along the second strip of insulating material and connecting the second electrical conductor to the second electrical potential terminal; inserting into a housing the assembly including the batteries, the two strips of insulating material and the two electrical conductors; attaching a first connector to the first and second electrical conductors and to the housing; and attaching a second connector to the first and second electrical conductors and to the housing. This method further comprises attaching another electrical energy source to the second connector so that such other electrical energy source is connected through the second connector in electrical series or electrical parallel with the batteries connected to the second connector.

Therefore, from the foregoing, it is a general object of the present invention to provide a novel and improved source of electrical energy and method of assembling the same. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is a longitudinal sectional view of a preferred embodiment of the electrical energy source of the present invention.

FIG. 2 is a schematic circuit diagram of the electrical circuit within the preferred embodiment shown in FIG. 1.

FIG. 3 illustrates an interconnection between batteries within the preferred embodiment shown in FIG. 1.

FIG. 4 is an end view of the batteries as taken along line 4—4 shown in FIG. 1.

FIG. 5 is an end view of the batteries as taken along line 5—5 shown in FIG. 1.

FIG. 6 is a partial assembly view showing a connector connected to the batteries within the preferred embodiment shown in FIG. 1.

FIG. 7 is a partial assembly view showing another connector connected to the batteries of the preferred embodiment shown in FIG. 1.

FIG. 8 is a schematic circuit diagram showing two of the units depicted in FIG. 1 connected in electrical parallel.

FIG. 9 is a schematic circuit diagram showing an alternative embodiment wherein individual cells within each unit are connected in electrical parallel and further showing two such units connected in electrical parallel.

FIG. 10 is a schematic circuit diagram showing still another alternative embodiment whereby two or more individual units constructed in accordance with the present invention can be selectably connected in electrical series or electrical parallel or used in a stand-along configuration.

DETAILED DESCRIPTION OF THE PREFERRED EMBODIMENTS

The preferred embodiment illustrated in FIGS. 1-7 defines the electrical energy source of the present invention as a battery pack or package 2. The pack 2 is illustrated as being connected to a downhole tool 4, such as an electronic pressure and temperature gauge or an electronic perforating gun; however, both this preferred embodiment and the overall concept of the present invention can be adapted for other uses. The pack 2 is constructed so that is can also be connected to additional, similar packs, one of which is indicated in FIG. 1 and identified by the reference numeral 2a.

The FIG. 1 preferred embodiment comprises a housing 6, power supply means 8 for providing an electrical potential, two connector means for connecting with the item which is to be energized and for connecting with additional battery packs as desired. These connector means are generally identifed in the drawings by the reference numerals 10, 12. The battery pack 2 also comprises conductor means for connecting the power supply means to the two connector means 10, 12 so that the electrical potential of the power supply means is applied across two respective portions or terminals of each of the two connector means 10, 12. The conductor means is schematically shown in FIG. 2 as including two separate electrically conductive paths 14, 16 associated with different portions of the power supply means at different realtive potential levels or polarities. These elements will be more particularly described with reference to FIGS. 1-7. Subsequently, exemplary alternative configurations will be described with reference to FIGS. 8-10.

The housing 6 includes an elongated, linearly extending tube 18 having an inner surface 20 defining a hollow interior extending between two opposite ends 22, 24 of the tube 18. The inner surface 20 is cylindrical and has an inner diameter 26 which is preferably to be maintained at a minimal tolerance relative to the power supply means 8 and the conductor means 14, 16 so that the inner diameter 26 of the tube 18 is substantially equal to an outer diameter 28 of the power supply means 8 whereby the outer diameter of the tube 18 can be substantially minimized. "Substantially equal" means that a minimal tolerance between the diameters 26, 28 is to be maintained in the preferred embodiment of the present invention in that no epoxy or other adhesive is to be filled in any gaps between the power supply means 8 and the inner surface 20, which is distinguishable form some prior designs of other types of battery packages wherein an adhesive material is applied along the length of the batteries used therein as its power supply. Thus, such minimal tolerance in this preferred embodiment is to accommodate only the conductor means 14, 16 and associated insulation layers described hereinbelow. Thus, the preferred embodiment of the present invention provides for a more compact lateral dimension which is important for its exemplary use in a downhole tool where space is limited.

The tube 18 is made of any suitable material, in general; however, in the preferred embodiment it is made of paper or other similar substance which can be pierced by a hypodermic needle for injecting an adhesive material adjacent ends of batteries used to define the power supply means 8 as subsequently described. As mentioned, however, such adhesive material is not injected along the length of such batteries in this preferred embodiment. In a specific embodiment, the tube can be made of a Nomex paper. Other materials can be used as desired, such as for making the housing 6 self-protective; this is distinguishable from the FIG. 1 preferred embodiment which is contemplated to be retained within a separate housing of the tool with which it is to be used, which separate housing is constructed to withstand the environmental conditions in which the overall tool is to be used.

Although as just described the housing 6 need not be "self-protective," it is protective in the sense that it receives and houses a plurality of batteries (shown in FIG. 1 to be four batteries 30, 32, 34, 36) defining the energization portion of the power supply means 8. The batteries 30, 32, 34, 36 are linearly arrayed giving the power supply means 8 a cylindrical shape having the aforementioned outer diameter 28. The batteries of the power supply means 8 are of any suitable type, such as lithium or alkaline or silver oxide. The batteries are electrically connected between the two electrically conductive paths 14, 16 of the conductor means. As schematically illustrated in FIG. 2, the batteries 30, 32, 34, 36 are connected in electrical series with a diode 38; however, they can be connected in electrical parallel as illustrated in FIG. 9 or in a suitable series/parallel combination.

For the serial connections illustrated in FIGS. 1 and 2, adjacent ones of the batteries are connected with the positive terminal of one connected to the negative terminal of another. In the preferred embodiment this is done by soldering or welding flexible conductors 40, 42 together and to the respective terminals 44 (positive), 46 (negative) as shown in FIG. 3 with reference to batteries 30, 32. The connected conductors 40, 42 are folded as illustrated and disposed within a space 48 defined between the immediately adjacent batteries 30, 32. FIG. 1 shows additional spaces 50, 52 which receive similarly connected conductors connected connected between batteries 32, 34 and 34, 36, respectively.

Through these described connections the four batteries 30, 32, 34, 36 are interconnected so that two overall terminals are defined. One of these is a relatively most negative terminal 54 which coincides with the negative terminal of the battery 30 disposed near the end 22 of the housing 6, and the other is a most positive terminal 56 which coincides with the positive terminal of the battery 36 disposed near the end 24 of the housing 6.

Also disposed at the end 22 of the housing 6 is the connector means 10. This is the connector means which in the exemplary use with a downhole tool shown in FIG. 1 is used for mechanically coupling with the mechanical connector of the downhole tool so that the electrical potential of the power supply means 8 is connected therethrough to the electrical circuit of the downhole tool 4. The connector means 10 includes a mechanical connector which is threaded for positively coupling with a mating connector of the tool 4. Of course, this coupling can also be used to connect the battery pack 2 to another battery pack in the manner illustrated by the connection between the battery pack 2a and the battery pack 2. This mechanical connector includes a connector plug 58 disposed concentrically and axially within an outer coupling collar 60, which parts are mechanically connected but electrically insulated and which define the two portions or terminals across which the electrical potential of the power supply means 8 appears.

The connector means 10 also includes a potting fixture 62 having a diameter complemental to the diameter of the end 22 of the tube 18 so that the potting fixture 62 is received in and attached to this end of the tube. The connector plug 58/coupling collar 60 combination is mechanically connected with the potting fixture 62 in a known manner.

More generally, the connector means 10 can be any suitable type. For example, one alternative is to use a multiple pin-type of connector wherein the pins are adaptable for selectable battery configurations so that the battery pack 2 can be connected to either the tool or to other battery packs in a desired electrical potential or electrical capacity configuration.

Connected to the opposite end of the tube 18 (i.e., the end 24) is the connector means 12 which, in general, is complementally formed to the connector means 10 so that the corresponding connector means 10 of another pack (such as the battery pack 2a) can be coupled to the connector means 12. In the illustrated embodiment of FIG. 1, the connector means 12 has an outer threaded sleeve 64 for threadedly coupling with the internally threaded coupling collar 60 of the other battery pack's connector corresponding to the connector means 10. Contained concentrically within the outer threaded sleeve 64 is an inner receptacle 66 for receiving the part of the other battery pack corresponding to the connector plug 58 of the connector means 10. Connected across the portions 64, 66 of the connector means 12 is the electrical potential of the power supply means 8.

The connector means 12 also includes a potting fixture 68 mechanically coupled with the sleeve 64/receptacle 66 combination. The potting fixture 68 is used similarly to the potting fixture 62, but for attaching the connector means 12 to the tube 18 at the end 24.

As with the connector means 10, any suitable type of connector can be used as the connector means 12, but preferably it is one complemental to the connector means 10. In general, the connector means 12 is of a type by which a selectable one of an electrical series or an electrical parlalel configuration can be established with another energy source, particularly one similar to the battery pack 2. Furthermore, both the connector means 10 and the connector means 12 are to be of types by which strong mechanical connections can be made in a readily connectible and disconnectible fashion in a manner superior to such mechanical connectors as banana jacks and set screws described hereinabove as having been used on other battery packages.

The connector means 10, 12 are connected to the terminals 54, 56 of the power supply means 8 by means of the conductor means; this is particularly accomplished through the separate conductive paths 14, 16. The conductive path 14 connects on polarity or terminal (terminal 56 in the preferred embodiment) to the two connector means 10, 12, and the conductive path 16 connects the other polarity or terminal (i.e., the terminal 54) of the power supply means 8 to the two connector means 10, 12. This provide the electrical potential developed by the power supply means 8 to both connector means 10, 12. This is schematically illustrated in FIG. 2.

The conductive path 14 connects the positive terminal 56 (through the diode 38) to the connector plug 58 of the connector means 10 and to the connector receptacle 66 of the connector means 12. The conductive path 14 includes an electrically conductive member 70 extending through the housing 6. In the preferred embodiment the conductive member 70 is a flat copper conductor having a plurality of folds 72 therein. The folds 72 permit the conductive member 70 to be extended in response to suitably acting forces without breaking the electrical continuity between the ends of the conductive member 70, which ends are shown in FIGS. 4 and 5 as being disposed adjacent, but insulated from, the terminal 54 at the end of the battery 30 and adjacent the terminal 56 at the end of the battery 36.

The conductor means which includes the member 70 also includes insulation means extending along the linearly disposed batteries 30, 32, 34, 36 for electrically insulating the electrically conductive member 70 from the terminal 54 (and any other potentials or terminals other than the most positive potential appearing at the terminal 56). In the preferred embodiment this insulation means includes a strip 74 of insulation tape adhered to the batteries between the two ends of the battery assembly as illustrated in FIGS. 4 and 5. For the exemplary use with a downhole tool, such tape should be of a suitable type to withstand the high temperatures found in wells in which such downhole tools can be used. One type of suitable tape is known as Kapton tape. With the strip of tape 64 so adhered to the assembly of batteries 30, 32, 34, 36, the electrically conductive member 70 is disposed adjacent this strip of tape along the length of the battery assembly as illustrated in the drawings. In the preferred embodiment an additional strip of similar insulating tape is then disposed on top of the conductive member 70.

FIGS. 4, 5, 6 and 7 illustrate the manner in which the conductive member 70 is connected to the respective portions of the connector means 10, 12. FIG. 4 shows one end of a wire 76 soldered to the end of the conductive member 70 adjacent the end 54 of the battery 30, the other end of wire 76 being suitably connected to the connector plug 58 (see FIGS. 4 and 6). At the other end of the assembly of batteries 30, 32, 34, 36, the other end of the conductive member 70 is connected to the terminal 56 through the diode 38. This other end of the conductive member 70 is also connected through a wire 78 to the connector receptacle 66 of the connector means 12 (see FIGS. 5 and 7).

The electrically conductive path 16 is similar to the electrically conductive path 14, except that the path 16 connects the other terminal of the battery assembly to the interconnectible portiosn 60, 64 of the connector means 10, 12, respectively. As with the electrically conductive path 14, the path 16 includes an electrically conductive member, this one being designated in the drawings by the reference numeral 80. The member 80 of the preferred embodiment is a flat conductive strip having a plurality of folds in it similar to the folds 72 of the conductive member 70. The conductive member 80 is disposed adjacent a strip 82 of insulation tape spaced circumferentially around the batteries from the strip 74. The strip 82 defines an insulation means by which the conductive member 80 is insulated from the potentials and terminals of the battery assembly other than the potential existing at the terminal 54, to which terminal 54 the conductive member is connected by a suitable means such as a conductive strap 84 illustrated in FIG. 4. Another strip of insulating tape (not shown) is disposed on top of the conductive member 80. FIGS. 4 and 6 show that the end of the conductive member 80 at the terminal 54 near the end 22 of the housing 6 is connected to the coupling collar 60 of the connector means 10 by means of a suitable wire 86. FIGS. 5 and 7 illustrate that the end of the conductive member 80 near the terminal 56 at the end 24 of the housing 6 is connected to the coupling sleeve 64 of the connector means 12 by means of a wire 88.

Of particular importance is this construction of the conductor means is the availability of the electrical potential at both ends of the battery pack 2 and the folded configuration of the conductive members 70, 80. The former is of significance in that it allows for additional battery packs to be connected in line with the battery pack 2 to provide different total voltages and/or capacities which are available to the electrical apparatus connected through the connector means 10. The latter is of significance in that it allows the conductive member 70, 80 to be deformed in response to forces which might act on them within the environment in which the battery pack 2 is to be used. By way of a specific example, such forces can be present when a perforating gun to which the battery pack 2 is attached is actuated in the downhole environment.

The preferred embodiment of the battery pack 2 also includes adhesive means, disposed substantially only in the spaced defined between immediately adjacent ones of the batteries 30, 32, 34, 36 and at the two ends 22, 24 of the tube 18, for affixing the batteries relative to the tube. In the preferred embodiment, epoxy is injected through the tube 18 into the spaces 48, 50, 52 and into the spaced shown in FIG. 1 between the potting fixture 62 and the end 54 of the battery 30 and between the potting fixture 68 and the end 56 of the battery 36. This adhesive prevents twisting between the batteries, provides strain relief for wires, as well as providing structural integrity to prevent the assembly from coming apart at the high temperatures that are encountered in a downhole environment, for example.

Assembling the illustrated preferred embodiment of FIG. 1 includes connecting the linear array of batteries 30, 32 34, 36 in electrical series so that the two endmost terminals 54, 56 are defined at opposite ends of the array. Of course, as previously mentioned, the batteries can alternatively be connected in electrical parallel or in a combination of series and parallel. When connected in series, the batteries are interconnected as illustrated in FIG. 3.

Once the array of batteries has been constructed, the strips 74, 82 of insulating material are placed lengthwise along the batteries between, and in overlapping relation with, the two ends at which the terminals 54, 56 are defined. The two flat electrical conductive members 70, 80 are then palced along the respective strips of insulating material and another layer of insulating material is placed on top of each conductive member along the full length of the battery array similar to the respective underlying layters 74, 82. The ends of the conductive members 70, 80 are bent at the ends of the batteries as shown in FIGS. 4 and 5.

The wires 76, 78 are connected to opposite ends of the conductive member 70, particularly to the end tap portions of the member 70 bent laterally inwardly along the respective ends of the battery array. The wires 86, 88 are similarly connected to the end tap portions of the conductive member 80. These connections are by soldering the wires to the flat conductive members or by other suitable means.

This assembly, including the batteries, the strips of insulating material and the electrical conductors, is then inserted into the tube 18 of the housing 6 to a position as illustrated in FIG. 1. The two connector means 10, 12 are then connected to the electrical conductors so that the electrical potential of the power supply means 8 is available at each connector means, and they are connected to respective ends of the housing in a suitable mechanically securing fashion.

FIG. 6 particularly illustrates that the connector means 10 has a wire 90 connected to the connector plug 58 and a wire 92 connected to the connector collar 60, which wires 90, 92 are soldered or otherwise suitably connected to the wires 76, 86, respectively, to thereby connect the electrical potential from the power supply means 8 acorss the connector plug 58 and the connector collar 60. A bead of RTV is placed around the inside of the tube to block off the annulus between the outer diameter of the batter 30 and the inner diameter of the tube. The RTV is allows to become tack-free, after which the connector means 10 is attached to the end 22 of the housing 6 by inserting the potting fixuter 62 into that end of the housing and injecting an epoxy through the tube wall to fill the void between the battery 30 and the potting fixture 62. This is preferably done with the tube in a vertical position until the epoxy has cured.

FIG. 7 illustrates a similar technique by which the connector means 12 is connected to the wires 78, 88. FIG. 7 shows that a wire 94 is connected to the receptacle 66 and a wire 96 is connected to the coupling sleeve 64. The wires 94, 96 are suitably connected, such as by soldering, to the wires 78, 88, respectively. The connector means 12 is then attached to the end 24 of the housing 6 in a manner similar to how the connector means 10 is attached to the end 22 of the housing 6.

Once this part of the installation has been completed, in the preferred embodiment an adhesive material is injected through the tube 18 between immediately adjacent ones of the batteries to fill the spaces 48, 50, 52 with adhesive to fix the array of batteries relative to each other and relative to the housing 6. The injection is made with a suitable hypodermic needle and syringe combination or other suitable device. The spaces 48, 50, 52 can be found by placing a light behing the paper tube of which the housing 6 is constructed in the preferred embodiment.

A further step of particular importance in the present invention is that of placing folds in the two flat conductive members 70, 80 so that the conductors are deformable (particularly, extendible) within the housing in response to the aforementioned forces which might act upon the conductive members.

In particular applications of the present invention, the method of assembling further comprises attaching another electrical energy source to an appropriate one of the connector means 10, 12 so that the other electrical energy source is connected solely through such connector means in either electrical series or electrical parallel with the batteries connected to such connector means. Two parallel configurations are shown in FIGS. 8 and 9.

In FIG. 8, the battery pack 2 and the parallel connected battery pack 2a have serially connected cells within themselves so that a voltage of four times the voltage of each battery cell is provided (assuming the voltage of each cell is equal). When these two battery packs are connected in parallel, the same voltage is provided at the connector means 10 of the battery pack 2 (and also at the connector means 12a of the battery pack 2a); however, more capacity is provided by the additional cells in the battery pack 2a (and in any further parallel packs which can be further added to the connected packs illustrated in FIG. 8).

In FIG. 9, each battery pack 202, 202a is constructed similarly to the packs 2, 2a except that each of the units 202, 202a has parallel connected battery cells within it. These parallel connected cells are in turn connected in electrical parallel with each other via connector means 212, 210a. Assuming that each battery has the same voltage, and that this voltage is equal to the voltage of each battery shown in the FIG. 8 configuration, then the FIG. 9 configuration has one-fourth the voltage at its connector means 210, 212a as is provided at the outer endmost connector means 10, 12a of the FIG. 8 configuration; however, again the parallel illustrated in FIG. 9 provides for an expansion energizing capacity.

A serial connection between two battery packs is schematically illustrated in FIG. 10 which shows a more general configuration of the present invention in that it is directly adaptable for either series or parallel interconnections with other similar packs. This configuration includes similarly constructed packs 302, 302a which each further includes a third conductive path 98 to which either of the previously described conductive paths is selectably connectible (these paths correspond to conductive paths 14, 16 as labeled with the prefix "3" in FIG. 10).

When one of the battery packs illustrated in FIG. 10 is used by itself, a suitable jumper wire 100 is connected between the conductive path 316 and the conductive path 98. To create a serial connection, the jumper 100 is not used, but a jumper 102 is connected between the conductive path 314a of the second battery pack 302a and the conductive path 316 of the first battery pack 302, and a jumper 104 is connected between the conductive path 316a of the second battery pack 302a and the conductive path 98 of the first battery pack 302 thereby making the electrical potential from the electrically seriesed power supplies of the two battery packs available at the connector means 310 of the first battery pack 302.

To connect the two battery packs shown in FIG. 10 in electrical parallel, the jumper 100 is used as are a jumper 106, connecting the electrically conductive paths 314, 314a together, and a jumper 108, connecting the electrically conductive paths 316, 316a together.

These jumpers can be implemented in any suitable way, such as by an adapter member which is connectible between the connector means 310a of one battery pack and the connector means 312 of another battery pack or by having the connector means themselves be adaptable to effect the jumpered connections or by other suitable means.

Thus, the present invention is well adapted to carry out the objects and attain the ends and advantages mentioned above as well as those inherent therein. While preferred embodiments of the invention have been described for the purpose of this disclosure, numerous changes in the construction and arrangement of parts and the performance of steps can be made by those skilled in the art, which changes are encompassed within the spirit of this invention as defined by the appended claims.

What is claimed is:

1. A source of electrical energy for a downhole tool having an electrical circuit connected to a mechanical connector, comprising:
    a tube having an inner surface defining a hollow interior extending between first and second ends of said tube;
    power supply means, disposed in said hollow interior of said tube, for providing an electrical potential;
    first connector means, attached to the first end of said tube and to said power supply means, for mechanically coupling with the mechanical connector of the downhole tool so that the electrical potential of said power supply means is connected therethrough to the electrical circuit of the downhole tool; and
    second connector means, attached to the second end of said tube and to said power supply means, for mechanically coupling with another source of electrical energy similar to this said source of electrical energy.

2. A source as defined in claim 1, wherein:
    said power supply means has a cylindrical shape having an outer diameter; and
    said inner surface of said tube has an inner diameter substantially equal to said outer diameter of said power supply means so that the outer diameter of said tube is substantially minimized.

3. A source as defined in claim 1, wherein said second connector means includes means for connecting this said source of electrical energy in a selectable one of an electrical series or an electrical parallel configuration with said another source of electrical energy.

4. A source as defined in claim 1, further comprising:
first adhesive means, disposed in said tube at the first end thereof, for affixing said first connector means and said power supply means to said tube; and
second adhesive means, disposed in said tube at the second end thereof, for affixing said second connector means and said power supply means to said tube.

5. A source as defined in claim 1, further comprising:
first conductor means, extending through said hollow interior of said tube, for connecting a first polarity of the electrical potential of said power supply means to said first and second connector means; and
second conductor means, extending through said hollow interior of said tube, for connecting a second polarity of the electrical potential of said power supply means to said first and second connector means.

6. A source as defined in claim 5, wherein said first and second conductor means include expandable folds so that said first and second conductor means are extendible in response to forces received within the downhole tool when the tool is disposed in a well.

7. An electrical energy source, comprising:
a housing;
power supply means, disposed in said housing, for providing an electrical potential;
a first connector attached to said housing;
a second connector attached to said housing; and
conductor means for connecting said power supply means to said first and second connectors so that the electrical potential is applied across two respective portions of each of said first and second connectors, said conductor means including a first flat electrically conductive member having a plurality of folds therein and extending through said housing adjacent said power supply means, said first flat electrically conductive member connected to said first and second connectors and to a first terminal of said power supply means; and a second flat electrically conductive member having a plurality of folds therein and extending through said housing adjacent said power supply means, said second flat electrically conductive member connected to said first and second connectors and to a second terminal of said power supply means.

8. An electrical energy source comprising:
a housing;
power supply means, including a plurality of batteries disposed in said housing, for providing an electrical potential;
a first connector attached to said housing;
a second connector attached to said housing; and
conductor means for connecting said power supply means to said first and second connectors so that the electrical potential is applied across two respective portions of each of said first and second connectors, said conductor means including:
a first electrically conductive member extending through said housing and connected to respective first portions of said first and second connectors; and
a second electrically conductive member extending through said housing and connected to respective second portions of said first and second connectors;
said batteries being electrically connected between said first and second electrically conductive members.

9. An electrical energy source as defined in claim 8, wherein said batteries are connected in electrical series between said first and second electrically conductive members.

10. An electrical energy source as defined in claim 8, wherein said batteries are connected in electrical parallel between said first and second electrically conductive members.

11. An electrical energy source as defined in claim 8, wherein:
said batteries are disposed linearly within said housing and said batteries are interconnected to define a first terminal and a second terminal; and
said conductor means further includes:
first insulation means, extending along said linearly disposed batteries, for electrically insulating said first electrically conductive member from said second terminal of said batteries; and
second insulation means, extending along said linearly disposed batteries, for electrically insulating said second electrically conductive member from said first terminal of said batteries.

12. An electrical energy source as defined in claim 11, wherein:
said first insulation means includes a first strip of insulation tape adhered to said batteries from one end of the linearly disposed batteries to the other end of the linearly disposed batteries;
said second insulation means includes a second strip of insulation tape spaced circumferentially from said first strip of tape and adhered to said batteries from said one end of the lineraly disposed batteries to said other end of the linearly disposed batteries;
said first electrically conductive member is disposed adjacent said first strip of tape along the length of said linearly disposed batteries and is electrically connected to said first terminal at said one end of the linearly disposed batteries; and
said second electrically conductive member is disposed adjacent said second strip of tape along the length of said linearly disposed batteries and is electrically connected to said second terminal at said other end of the linearly disposed batteries.

13. An electrical energy source as defined in claim 12, further comprising adhesive means, disposed substantially only in space defined between immediately adjacen tones of said batteries and at said one end and said other end of said linearly disposed batteries, for affixing said batteries realtive to said housing.

14. An electrical energy source as defined in claim 7, wherein said first and second connectors are complementally shaped so that a plurality of said electrical energy sources are interconnectible.

15. A method of assembling an electrical energy source, comprising:
connecting a linear array of batteries in electrical combination so that a first electrical potential terminal is defined and so that a second electrical potential terminal is defined;

placing a first strip of insulating material lengthwise along the batteries between the ends thereof;

placing a second strip of insulating material lengthwise along the batteries between the ends thereof;

placing a first electrical conductor along the first strip of insulating material and connecting the first electrical conductor to the first electrical potential terminal;

placing a second electrical conductor along the second strip of insulating material and connecting the second electrical conductor to the second electrical potential terminal;

inserting into a housing the assembly including the batteries, the two strips of insulating material and the two electrical conductors;

attaching a first connector to the first and second electrical conductors and to the housing; and attaching a second connector to the first and second electrical conductors and to the housing.

16. A method as defined in claim 15, further comprising placing folds in the first and second electrical conductors so that the conductors are extendible within the housing.

17. A method as defined in claim 15, further comprising, after inserting the assembly into the housing, injecting through the housing an adhesive material between immediately adjacent ones of said batteries.

18. A method as defined in claim 15, further comprising attaching another electrical energy source to the second connector so that the another electrical energy source is connected through the second connector in electrical series with the batteries connected to the second connector.

19. A method as defined in claim 15, further comprising attaching another electrical energy source to the second connector so that the another electrical energy source is connected through the second connector in electrical parallel with the batteries connected to the second connector.

* * * * *